Patented Mar. 9, 1948

2,437,427

UNITED STATES PATENT OFFICE 2,437,427

INSECTICIDAL COMPOSITIONS COMPRISING A PHENYL ESTER OF CAPRYLPHENOXYACETIC ACID

William F. Hester, Drexel Hill, and W E Craig, Philadelphia, Pa., assignors to Röhm & Haas Company, Philadelphia, Pa., a corporation of Delaware No Drawing. Application June 14, 1945, Serial No. 599,509

12 Claims. (Cl. 167—30)

1

This invention concerns insecticidal compositions comprising a phenyl ester of caprylphenoxyacetic acid and a carrier therefor. Such compositions may be used for the control of insects, particularly soft-bodied insects, on living plants with safety and efficiency. They are also of value when applied to woolen fabrics for protection against moths.

The toxic agents upon which the insecticidal compositions of this invention are based have the general formula, caprylPhOCH$_2$—COOPh', wherein Ph and Ph' represent phenyl nuclei. In the preferred form of this invention, at least one of these phenyl nuclei carries a substituent such as chloro, bromo, nitro or alkyl (in addition to the capryl group of the first nucleus), preferably on the esterified phenol group.

Typical compounds are the boromophenyl, chlorophenyl, nitrophenyl, bromonitrophenyl, nitroalkylphenyl, bromoalkylphenyl, or chloroalkylphenyl esters of caprylphenoxyacetic, bromocaprylphenoxyacetic, bromonitrocaprylphenoxyacetic, chloronitrocaprylphenoxyacetic, nitrocaprylphenoxyacetic, chlorocaprylphenoxyacetic, or bromomethylcaprylphenoxyacetic acids.

Such esters may be prepared by conventional reactions. For example, a caprylphenoxyacetyl halide may be condensed with a phenol or phenate. Again, a caprylphenoxyacetic acid may be esterified with a phenol. Substituents may be introduced before or after esterification, as seems most expedient. The best procedure for preparing any given ester will depend upon the nature of the substituents and will be evident to those skilled in the art. Likewise, the variations in substituent groups which can readily be effected will be evident.

The compositions of this invention may be prepared by incorporating one of the above esters with a solid carrier in a form suitable for dusting or for dispersion in an aqueous spray. Similarly, the ester may be dissolved in a liquid carrier, such as an innocuous solvent therefor, and this solution dispersed in an aqueous spray with the aid of an emulsifying agent.

In the following illustrative examples, details are presented of both the preparation of some typical esters and the preparation of insecticidal compositions with such esters.

Example 1

Preparation of nitro-tert.-butylphenyl caprylphenoxyacetate.—There were mixed 56.5 grams of caprylphenoxyacetyl chloride, 39 grams of mononitro-p-tert.-butylphenol, 24 grams of pyridine, and 150 grams of ethylene chloride. The mixture was stirred and heated under reflux for three hours. The reaction mixture was cooled, washed twice with 2N-hydrochloric acid solution, washed three times with 2N-sodium hydroxide solution, and then dried over calcium chloride. The solution was then concentrated under reduced pressure on a hot water bath. There was obtained a viscous dark-brown oil in an amount of 43 grams. It contained 90% (by analysis) of the desired product, 2-nitro-4-tert.-butylphenyl caprylphenoxyacetate.

Example 2

Preparation of bromonitro-tert.-butylphenyl bromocaprylphenoxyacetate.—Bromocaprylphenoxyacetic acid, prepared as described in our copending application Serial No. 599,510, filed on even date, was converted to the corresponding acyl chloride with phosphorus trichloride. A mixture was made from 170 parts of this chloride, 180 parts of 2-bromo-4-tert.-butyl-6-nitrophenol, 60 parts of pyridine, and 190 parts of ethylene chloride. It was heated on a boiling water bath for two hours. The reaction mixture was then cooled, washed with dilute hydrochloric acid twice, washed with dilute sodium hydroxide thrice, and with water once. The solution was then concentrated by heating on a water bath under reduced pressure. A residue of 135 parts of a viscous brown oil was obtained.

As indicated above, the esters as prepared may be mixed with a solvent or with a finely divided solid. For this purpose, it is not essential that the solvent utilized in the preparation of the esters be removed before the mixing is carried out. If desired, the solvent solution of ester may be applied directly to a powder and then the solvent may be evaporated. Also, solvent solutions may be utilized in the preparation of emulsifiable compositions with or without subsequent evaporation of the volatile solvent.

Typical compositions which may be prepared may be made with one part of the esters of this invention, one to ten parts of a solvent therefor, and one tenth to one part of an organic solvent-soluble emulsifying agent. Suitable solvents include pine oil, alkylated benzenes, liquid higher alcohols, such as capryl alcohol or decyl alcohol, cyclohexanol, and various vegetable and mineral oils, or mixture of such solvents. Suitable emulsifiers include the polyalkoxy ether alcohols of long-chained phenols and alcohols, such as octylphenoxypolyethoxyethanol or diisobutylphenoxypolyethoxyethanol, condensates of polyglycerol and long-chained fatty acids, petroleum sulfonates, and other solvent-soluble emulsifiers. On the other hand, the emulsifier need not be incorporated with the solution of ester and may be added at the time the composition is to be diluted for spraying.

When solid compositions are desired, there may be used any inert finely divided material, such as clay, talc, pyrophyllite, asbestine, magnesium carbonate, chalk, silica, alum sludge, lime, and the like. The ester may be mixed therewith or dispersed therewith directly or from a solvent solution, as indicated above. Spreaders or stickers may be added. Dusts may be prepared to contain one half to ten per cent of one or more of the esters.

Typical compositions are:

| | Parts |
|---|---|
| Toxicant | 1 |
| Talc | 98 |
| Spreader | 1 | or

| | |
|---|---|
| Toxicant | 2 |
| Alum sludge | 48 |
| Lime | 48 |
| Soya bean oil | 2 |

The esters may be used as the sole toxic agent in an insecticidal composition or as one of several toxicants, which may include pyrethrins, rotenone, nicotine, organic thiocyanates, or other organic toxicants, or any of the inorganic toxicants. The esters may also be used in conjunction with fungicides.

Some typical specific applications of the phenyl esters of caprylphenoxyacetic acid follow.

Example 3

(a) Bromophenyl caprylphenoxyacetate was taken up in pine oil and an oil-soluble petroleum sulfonate in the proportions of 1:2:1. One part of this composition was stirred into 1000 parts of water and the resulting emulsion sprayed onto nasturtium plants infested with aphids. At this low concentration of toxicant (1 to 4000), about half of the aphids were dead within twenty-four hours. As the concentration was increased, the control of aphids increased rapidly. At 1 to 1000 of toxicant to water, a very satisfactory control could be obtained.

(b) A dust was prepared containing 1% of the same ester in magnesium carbonate. This was applied to bean plants infested with Mexican bean beetle larvae, with a control of 70%.

(c) Woolen cloth was padded through a solution of this same ester in a petroleum solvent and dried. After the cloth had been aged for six weeks, it was placed in a box containing carpet beetles. The beetles avoided feeding on the impregnated cloth.

Example 4

(a) o-Nitro-p-tert.-butylphenyl caprylphenoxyacetate was taken up with pine oil and the condensate of polyglycerol, coconut fatty acids, and maleic acid in the ratio of two to five to one. This composition was stirred into water to give a spray containing one part of toxicant to 3000 parts of water. This spray applied to nasturtiums infested with aphids gave a control of 70%.

(b) A dust was prepared from the above compound at 1% and magnesium carbonate, and was applied to bean plants infested with Mexican bean beetle larvae. A control of 56% was thus obtained.

Example 5

A mixture of one part of nitro-tert.-amylphenyl caprylphenoxyacetate, one part of octylphenoxypolyethoxyethanol, and 98 parts of magnesium carbonate was prepared. One part of this mixture was taken up in 100 parts of water and sprayed on bean plants infested with Mexican bean beetle larvae. A control of 86% was obtained.

Example 6

A mixture like that in Example 5 was prepared with o-bromo-o'-nitro-p-tert.-butylphenyl bromocaprylphenoxyacetate and tested against Mexican bean beetle larvae with a control of 69%.

We claim:

1. An insecticidal composition comprising as a toxic agent a water-insoluble, organic solvent-soluble phenyl caprylphenoxyacetate dispersed in a carrier.

2. An insecticidal composition comprising as a toxic agent an organic solvent-soluble halophenyl caprylphenoxyacetate dispersed in a carrier.

3. An insecticidal composition comprising as a toxic agent an organic solvent-soluble nitrophenyl caprylphenoxyacetate dispersed in a carrier.

4. An insecticidal composition comprising as a toxic agent bromophenyl caprylphenoxyacetate dispersed in a carrier.

5. An insecticidal composition comprising as a toxic agent nitro-tert.-butylphenyl caprylphenoxyacetate dispersed in a carrier.

6. An insecticidal composition comprising as a toxic agent nitro-tert.-amylphenyl caprylphenoxyacetate dispersed in a carrier.

7. An insecticidal composition comprising as a toxic agent a water-insoluble, organic solvent-soluble phenyl caprylphenoxyacetate and a solid carrier therefor.

8. A process of controlling soft-bodied insects on living plants which comprises applying thereto a composition comprising a minor proportion of a water-insoluble, organic solvent-soluble phenyl caprylphenoxyacetate and a major proportion of a carrier therefor.

9. A process of controlling soft-bodied insects on living plants which comprises applying thereto a composition comprising a minor proportion of a water-insoluble, organic solvent soluble phenyl caprylphenoxyacetate dispersed in a major proportion of a solid carrier therefor.

10. A process of controlling soft-bodied insects on living plants which comprises applying thereto a composition comprising a minor proportion of bromophenyl caprylphenoxyacetate and a major proportion of a carrier therefor.

11. A process of controlling soft-bodied insects on living plants which comprises applying thereto a composition comprising a minor proportion of nitro-tert.-butylphenyl caprylphenoxyacetate and a major proportion of a carrier therefor.

12. A process of controlling soft-bodied insects on living plants which comprises applying thereto a composition comprising a minor proportion of nitro-tert.-amylphenyl caprylphenoxyacetate and a major proportion of a carrier therefor.

WILLIAM F. HESTER.
W E CRAIG.

REFERENCES CITED

The following references are of record in the file of this patent:

UNITED STATES PATENTS

| Number | Name | Date |
|---|---|---|
| 1,021,095 | Grether | Mar. 26, 1912 |
| 2,179,209 | Daimler et al. | Nov. 7, 1939 |
| 2,299,604 | Weirich | Oct. 20, 1942 |